Aug. 8, 1939.    R. T. BURNETT    2,168,700
BRAKE
Filed June 5, 1937    2 Sheets-Sheet 1

INVENTOR
RICHARD T. BURNETT
BY
ATTORNEY

Aug. 8, 1939.  R. T. BURNETT  2,168,700
BRAKE
Filed June 5, 1937  2 Sheets-Sheet 2

INVENTOR
RICHARD T. BURNETT
BY
ATTORNEY

Patented Aug. 8, 1939

2,168,700

UNITED STATES PATENT OFFICE 2,168,700

BRAKE

Richard T. Burnett, Mishawaka, Ind., assignor to Bendix Products Corporation, South Bend, Ind., a corporation of Indiana Application June 5, 1937, Serial No. 146,568

4 Claims. (Cl. 188—78)

This invention relates to brakes, and is illustrated as embodied in an internal expanding brake for an automobile wheel.

An object of the invention is to provide simple and reliable means for returning the shoes yieldingly to a centered position when the brake is released, the centering means being powerful enough for use even on a relatively heavy truck brake or the like. Another object is to arrange such centering means to act on the shoes along their center lines, so that there is no tendency to twist the shoes or get them out of alinement.

These and other objects of the invention, and various novel features of construction and arrangement, will be apparent from the following description of the illustrative embodiment shown in the accompanying drawings, in which.

Figure 1:
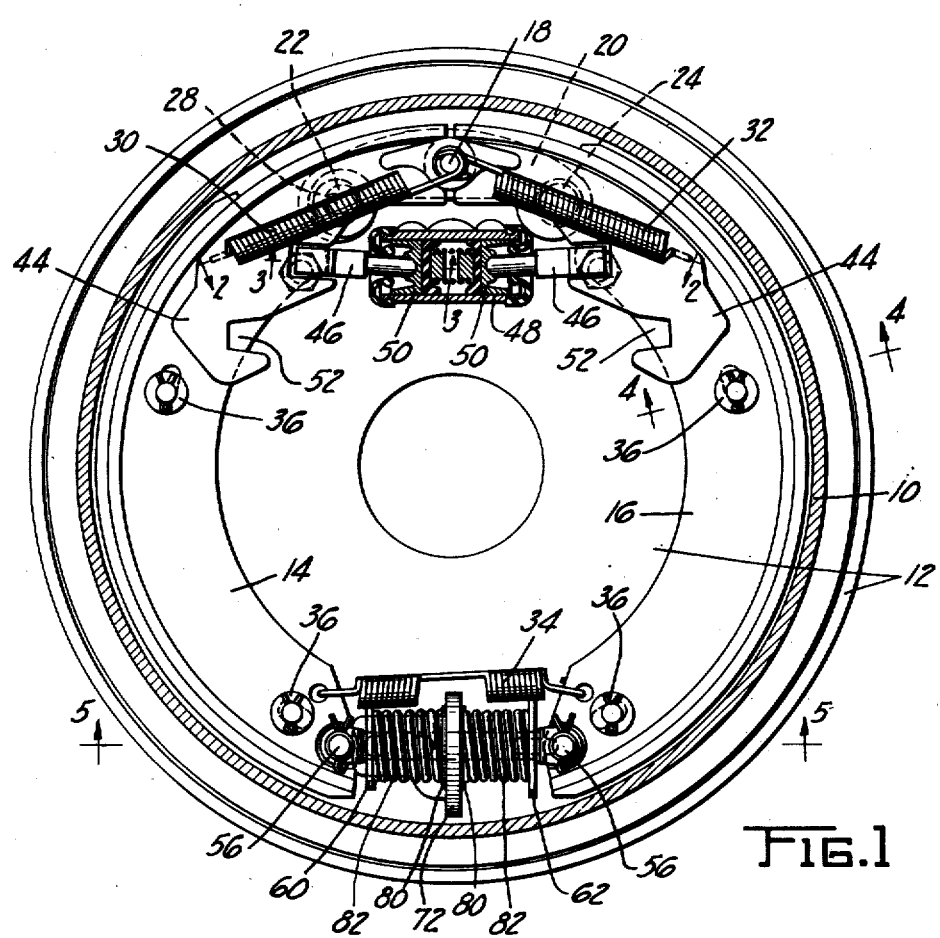
Figure 1 is a vertical section through the brake, just inside the head of the brake drum, and showing the brake shoes in side elevation.
Figure 2:
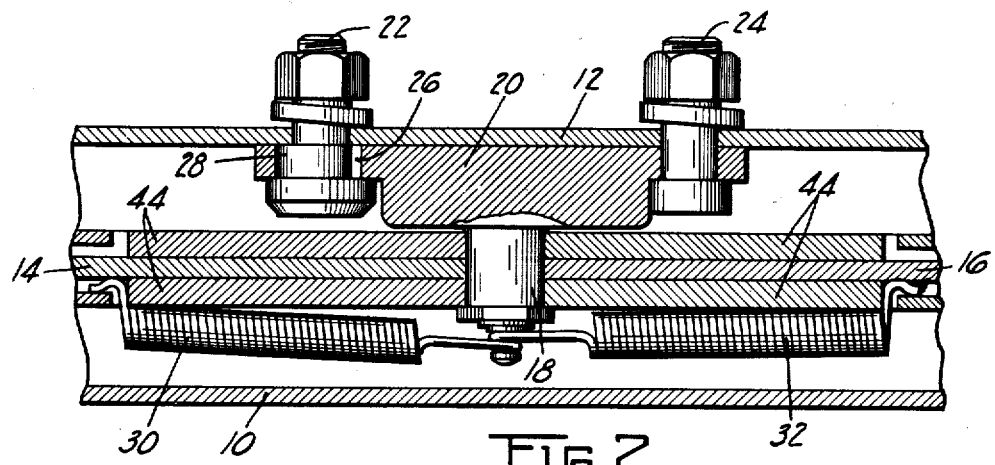
Figure 2 is a partial section, on a larger scale, on the line 2—2 of Figure 1, showing the brake anchorage means.
Figure 3:
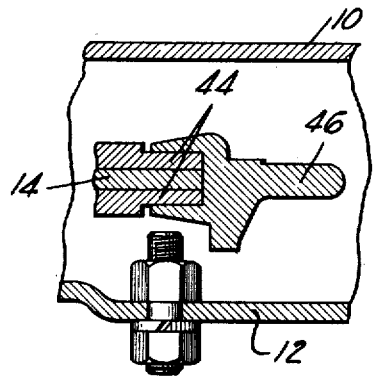
Figure 3 is a partial section on the line 3—3 of Figure 1, showing the connection between the applying means and one of the shoes.

The illustrated brake includes a rotatable drum 10, at the open side of which is a support such as a backing plate 12, and within which are a pair of T-section brake shoes 14 and 16 faced with suitable friction material.

The shoes 14 and 16 (or the equivalent) are provided with suitable anchorage and applying means. The illustrated anchorage means consists of an anchor post 18, which may be an integral extension from a bracket 20 secured to the inner face of the backing plate. The bracket is shown adjustably secured to the backing plate by bolts or the like 22 and 24, the former passing through a suitable slot 26 and having an eccentric portion 28 engaging the bracket to facilitate adjusting its positon radially by pivoting it about the bolt 24.

The end of the anchor post 18 is reduced in size to facilitate the attachment of return springs 30 and 32 connected to the shoes. The spring connected to the secondary shoe (i. e., the one which is anchored during forward braking) is preferably somewhat stronger than the other. A spring 34 may be tensioned between the lower ends of the shoes, to minimize rattling, if desired.

Figure 4:
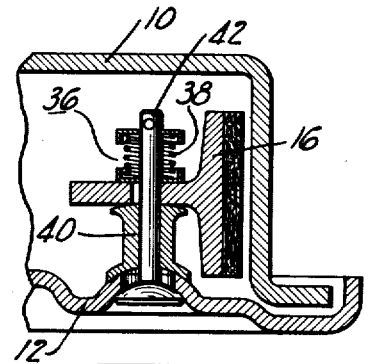
Figure 4 is a partial section on the line 4—4 of Figure 1, showing one of the steady rests.
Figure 5:
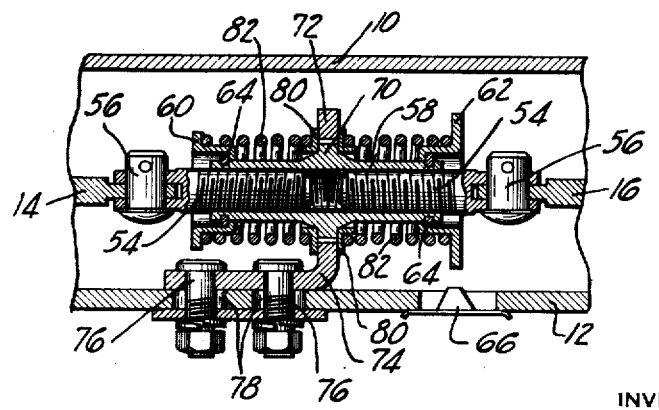
Figure 5 is a section through the novel centering means on the line 5—5 of Figure 1.

The shoes may be provided with suitable steady rests 36, for example of the form shown in Figure 4, with a spring 38 acting to hold the shoe web against a spool-shaped sleeve 40 mounted on a pin 42, with the end of the sleeve and the head of the pin universally embracing between them a partially spherical portion pressed from the backing plate.

Reinforcing plates 44 are shown welded to the sides of the anchor-engaging ends of the shoes. These plates are notched to receive the forked ends of thrust members 46. These members are operated by a hydraulic applying device shown as including a cylinder 48 containing pistons 50 engaging and acting on the thrust members 46. The plates 44 may also be notched at 52 for engagement by a mechanical applying linkage (not shown), such as is often used for emergency operation of the rear brakes.

The lower ends of the shoes are adjustably connected by means such as alined thrust members 54 connected to the shoe webs by pivots 56. Members 54 are threaded into opposite ends of a right-and-left threaded sleeve 58 which can be turned to draw members 54 together or force them apart. The member 58 has at its ends abutments, such as washers 60 and 62 held by snap rings 64.

At least one of the abutments, shown as the abutment 62, is non-rotatably mounted on its end of the sleeve 58 (for example the sleeve may be exteriorly non-circular in outline and the washer 62 formed with an opening of corresponding shape). This abutment is accessible through the backing plate (e. g. by removing a cover 66 from a small opening), so that it can be engaged by a suitable tool to turn the sleeve 58 to adjust the brake for wear.

According to an important feature of the invention, the sleeve 58 (or an equivalent part floating with the shoes) is utilized as part of a novel spring centering device. To this end, the sleeve 58 is shown formed with a central peripheral rib 70 which, when the brake is released, is encircled by a part 72 of a bracket 74 adjustably and stationarily held by means such as bolts 76 passing through slots 78 in the backing plate 12.

Floating washers 80 are seated against opposite sides of the rib 70 and the stationary part 72 which encircles it. Centering springs, preferably coil springs 82 coaxially encircling the sleeve 58 on opposite sides of the rib 70, are compressed between the respective washers 80 and the corresponding abutments 60 and 62.

When the brake is applied, the sleeve 58 shifts with the shoes in one direction or the other to cause one of the abutments 60 or 62 further to compress the corresponding spring 82 against the stationary part 72. When the brake is released, this spring serves to shift the lower ends of the shoes back to centered position, with the springs 82 balanced.

While one illustrative embodiment has been described in detail, it is not my intention to limit the scope of the invention to that particular embodiment, or otherwise than by the terms of the appended claims.

I claim:

1. A brake comprising, in combination with applying and anchorage means, a backing plate, shoes having an adjustable connection including alined thrust members engaging the shoe ends and threaded into opposite ends of a connecting sleeve, said sleeve having a central external peripheral rib and end abutments, a member adjustably mounted on the backing plate and having a part encircling said rib when the brake is released, washer members normally seated against opposite sides of said rib and said encircling part, and coil springs coaxially encircling the ends of said sleeve and each arranged between one of said abutments and the coresponding washer member, one of said abutments being non-rotatably mounted on the sleeve and being accessible through the backing plate for turning said sleeve to adjust the brake.

2. A brake comprising, in combination with applying and anchorage means, shoes having an adjustable connection including alined thrust members engaging the shoe ends and threaded into opposite ends of a connecting sleeve, said sleeve having a central external perpiheral rib and nd abutments, a stationary member having a part encircling said rib when the brake is released, washer members normally seated against opposite sides of said rib and said encircling part, and springs each arranged between one of said abutments and the corresponding washer member, one of said abutments being non-rotatably mounted on the sleeve and being operable to turn said sleeve to adjust the brake.

3. A brake comprising, in combination with applying and anchorage means, a backing plate, shoes having an adjustable connection including a connecting sleeve, said sleeve having a central external peripheral rib and end abutments, a member adjustably mounted on the backing plate and having a part encircling said rib when the brake is released, washer members normally seated against opposite sides of said rib and said encircling part, and coil springs coaxially encircling the ends of said sleeve and arranged between one of said abutments and the corresponding washer member, one of said abutments being non-rotatably mounted on the sleeve and being accessible through the backing plate for turning said sleeve to adjust the brake.

4. A brake comprising, in combination with applying and anchorage means, shoes having an adjustable connection including a connecting sleeve, said sleeve having a central external peripheral rib and end abutments, a stationary member having a part encircling said rib when the brake is released, washer members normally seated against opposite sides of said rib and said encircling part, and springs each arranged between one of said abutments and the corresponding washer member, one of said abutments being non-rotatably mounted on the sleeve and being operable to turn said sleeve to adjust the brake.

RICHARD T. BURNETT.

CERTIFICATE OF CORRECTION.

Patent No. 2,168,700.　　　　　　　　　　　　　　August 8, 1939.

RICHARD T. BURNETT.

It is hereby certified that error appears in the printed specification of the above numbered patent requiring correction as follows: Page 2, first column, line 38, claim 2, for "nd" read --end--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.

with the shoes in one direction or the other to cause one of the abutments 60 or 62 further to compress the corresponding spring 82 against the stationary part 72. When the brake is released, this spring serves to shift the lower ends of the shoes back to centered position, with the springs 82 balanced.

While one illustrative embodiment has been described in detail, it is not my intention to limit the scope of the invention to that particular embodiment, or otherwise than by the terms of the appended claims.

I claim:

1. A brake comprising, in combination with applying and anchorage means, a backing plate, shoes having an adjustable connection including alined thrust members engaging the shoe ends and threaded into opposite ends of a connecting sleeve, said sleeve having a central external peripheral rib and end abutments, a member adjustably mounted on the backing plate and having a part encircling said rib when the brake is released, washer members normally seated against opposite sides of said rib and said encircling part, and coil springs coaxially encircling the ends of said sleeve and each arranged between one of said abutments and the coresponding washer member, one of said abutments being non-rotatably mounted on the sleeve and being accessible through the backing plate for turning said sleeve to adjust the brake.

2. A brake comprising, in combination with applying and anchorage means, shoes having an adjustable connection including alined thrust members engaging the shoe ends and threaded into opposite ends of a connecting sleeve, said sleeve having a central external perpiheral rib and nd abutments, a stationary member having a part encircling said rib when the brake is released, washer members normally seated against opposite sides of said rib and said encircling part, and springs each arranged between one of said abutments and the corresponding washer member, one of said abutments being non-rotatably mounted on the sleeve and being operable to turn said sleeve to adjust the brake.

3. A brake comprising, in combination with applying and anchorage means, a backing plate, shoes having an adjustable connection including a connecting sleeve, said sleeve having a central external peripheral rib and end abutments, a member adjustably mounted on the backing plate and having a part encircling said rib when the brake is released, washer members normally seated against opposite sides of said rib and said encircling part, and coil springs coaxially encircling the ends of said sleeve and arranged between one of said abutments and the corresponding washer member, one of said abutments being non-rotatably mounted on the sleeve and being accessible through the backing plate for turning said sleeve to adjust the brake.

4. A brake comprising, in combination with applying and anchorage means, shoes having an adjustable connection including a connecting sleeve, said sleeve having a central external peripheral rib and end abutments, a stationary member having a part encircling said rib when the brake is released, washer members normally seated against opposite sides of said rib and said encircling part, and springs each arranged between one of said abutments and the corresponding washer member, one of said abutments being non-rotatably mounted on the sleeve and being operable to turn said sleeve to adjust the brake.

RICHARD T. BURNETT.

CERTIFICATE OF CORRECTION.

Patent No. 2,168,700. August 8, 1939.

RICHARD T. BURNETT.

It is hereby certified that error appears in the printed specification of the above numbered patent requiring correction as follows: Page 2, first column, line 38, claim 2, for "nd" read --end--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.